Oct. 10, 1933.   H. LEWINSOHN ET AL   1,930,244
ILLUMINATED MIRROR
Filed June 24, 1933   2 Sheets-Sheet 1
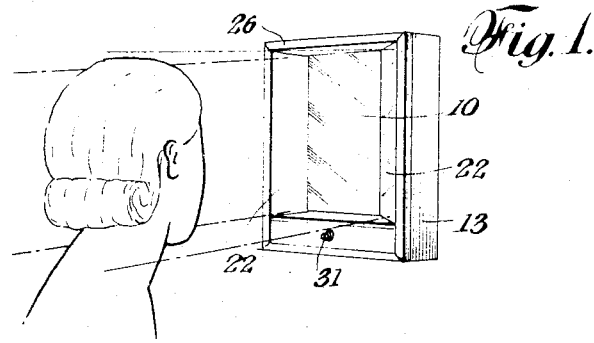
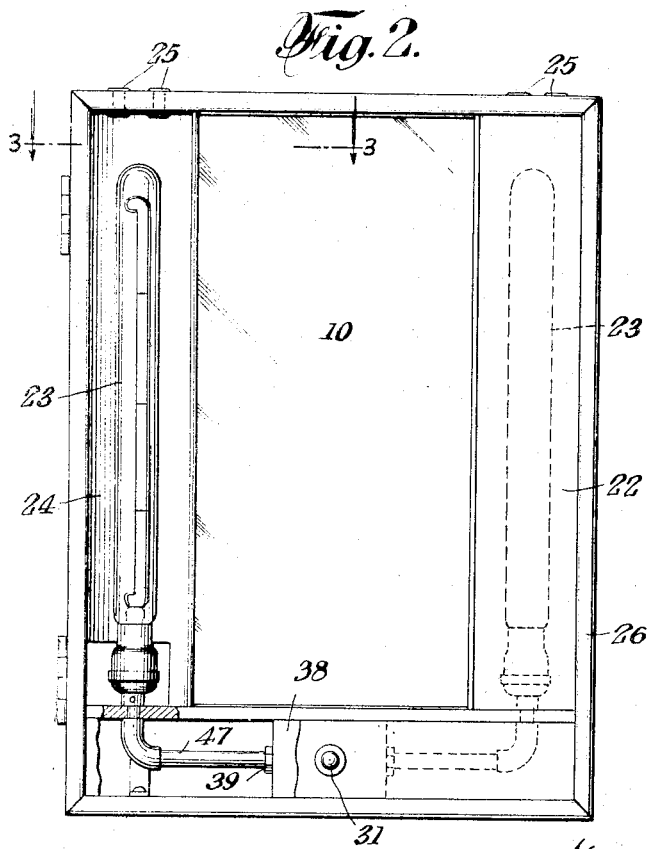
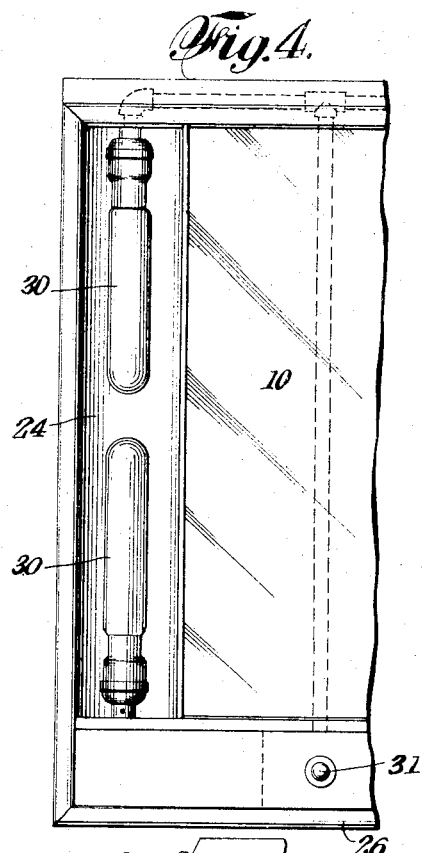
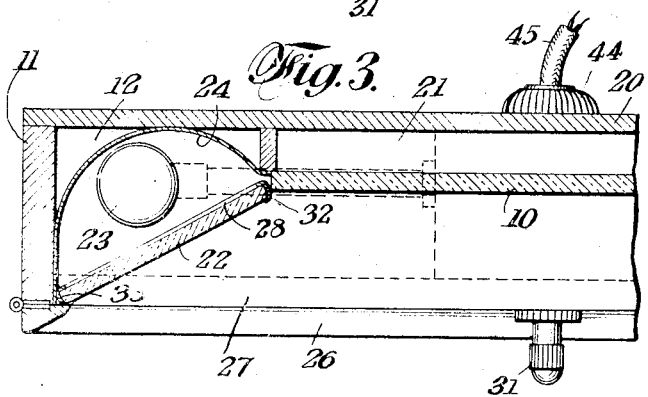
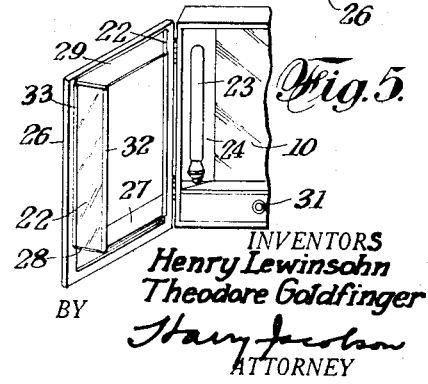
INVENTORS
Henry Lewinsohn
Theodore Goldfinger
BY
ATTORNEY Oct. 10, 1933.  H. LEWINSOHN ET AL  1,930,244
ILLUMINATED MIRROR
Filed June 24, 1933  2 Sheets-Sheet 2
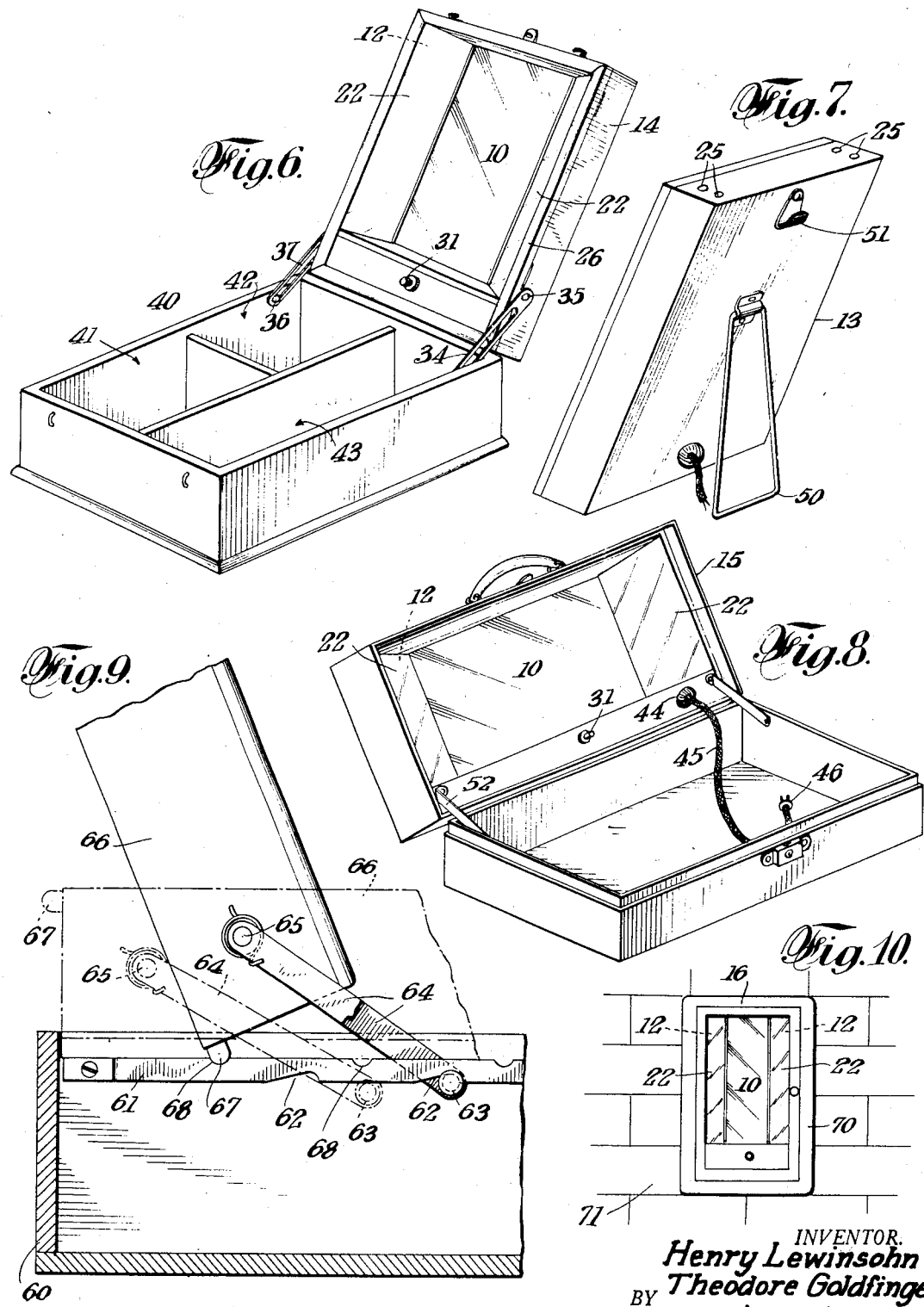
INVENTOR.
Henry Lewinsohn
Theodore Goldfinger
BY
Harry Jacobson
ATTORNEY Patented Oct. 10, 1933

1,930,244

UNITED STATES PATENT OFFICE 1,930,244

ILLUMINATED MIRROR

Henry Lewinsohn and Theodore Goldfinger, New York, N. Y.

Application June 24, 1933. Serial No. 677,352

12 Claims. (Cl. 240—4.1)

This invention relates to dressing mirrors and particularly, to the means for suitably illuminating the face of the person using the mirror.

Our invention contemplates the provision of simple, efficient and comparatively inexpensive means for mounting a mirror and lighting means associated therewith and adapted to illuminate the face of the user for toilet purposes.

Our invention further contemplates the provision of a combination mirror and illuminating means for the user of the mirror whereby the mirror may be used in connection with a portable article, and is accessible for use wherever electricity is available.

Our invention further contemplates the provision of an illuminating means and mirror combination which may be inexpensively made but which is safe, durable and not likely to get out of order nor easily broken.

The various objects of our invention will be clear from the description which follows, and from the drawings, in which, Fig. 1 is a perspective view of our improved mirror and illuminating means showing how the light is directed upon the face of the user for clarity and distinctness of vision.

Fig. 2 is a front elevation of the same, certain of the parts having been removed to show the interior structure.

Fig. 3 is a horizontal section of the same, taken on the line 3—3 of Fig. 2.

Fig. 4 is a front elevation of a modified form of our invention wherein a pair of aligned illuminating tubes are used instead of a single tube.

Fig. 5 is a perspective view of the diffusing glasses secured to a hinged member, thereby permitting easy access to the lamps for replacement thereof.

Fig. 6 is a perspective view of our invention as it appears applied to a make-up box for theatrical or personal use.

Fig. 7 is a similar view of a standing mirror adapted to be arranged on a dressing or other table or support or to be hung up on the wall, as desired.

Fig. 8 is a similar view of a portmanteau, overnight bag, luggage case or the like, to which our invention has been applied, and showing the combined mirror and illuminator mounted in the cover.

Fig. 9 is a vertical section of a portion of a portable container such as the make-up box of Fig. 6, showing a modified form of the cover arrangement whereby the mirror containing cover may be adjusted in various positions relatively to the remainder of the container.

Fig. 10 is a front elevation of our invention as it appears applied to the mirror door of a medicine cabinet.

In that practical embodiment of our invention illustrated by way of example and as best shown in Figs. 2 and 3, the mirror 10 is so arranged in the frame 11 as to provide a lighting compartment as 12 on each side thereof. It will be understood that the frame 11 may be made of various forms, depending upon the particular application of our invention. For example, said frame may form a suitable ornamental mirror frame as 13 such as is well known in the mirror art and applied to standing, hanging or adjustable or permanent dresser mirrors. Or, the frame may form the cover 14 of a make-up box, as shown in Fig. 6, or the cover 15 of a luggage case or bag as in Fig. 8, or the mirror enclosing member 16 of the door of a medicine cabinet, as shown in Fig. 10. In any case, however, we prefer to space the mirror 10 from the back 20 of the frame or cover whereby an air space 21 adapted for ventilation purposes, is provided behind the mirror. A sheet of translucent material such as ground glass 22 or milk glass or other light diffusing means is arranged in angular position to close the front of the compartment 12.

The plane of the light diffusing glass 22 is disposed obliquely to the plane of the mirror 10, such glass being preferably arranged on each side of the mirror 10. Light sources, preferably of an elongated type of incandescent lamp 23, suitably supplied with electric current, is disposed behind the diffusing glass 22. A reflector 24 is provided for reflecting light from the lamp 23 in the proper direction to illuminate the entire face of a person whose image is viewed in the mirror 10. Vents 25 are provided, preferably in the frame 11 above each of the lamps, for the purpose of permitting escape of heat from the inside of the compartment 12, thereby preventing an excessive temperature in connection with the device. The illuminating means, consisting of a source of light 23, a reflector 24 of suitable shape to reflect the major portion of the light toward the object being observed, and the diffusing means in the form of the milk glass 22 are preferably arranged along each side of the mirror 10 and provide a light source of suitable height with respect to the object whose image is viewed in the mirror. Thus, when the face is illuminated, the length of the light source 23 and diffusing glass 22 and reflector 24 is preferably of the length sufficient to illuminate the face in a vertical direction and each side thereof. The illuminating compartments may be placed at the top and bottom of the mirror 10, if desired, as well as on the sides, in a manner which is obvious and hence needs no further description nor illustration. The frame 11, which contains the mirror 10 and illuminating means 22, 23 and 24, may be constructed of any suitable material such as wood, metal, leather, fibre, etc. The light source may be in the form of a series of lamps 30, as shown in Fig. 4, if desired, but in any case the light source is controlled by a switch 31 of any well known type.

Said switch is preferably housed in a suitable metallic box 38 provided with side outlets 39 for the conductors leading to the lamps, and with a rear outlet adapted to receive a plug 44 which in turn is adapted to be connected to a suitable source of current by means of a length of wire 45 terminating in another plug 46.

We prefer also to enclose the leads from the switch to the lamp in a suitable pipe 47, suitably supported by brackets or the like, secured to the frame 11, whereby a fire-proof installation is provided, all in accordance with the rules and regulations made in such cases by the fire underwriters.

As shown in Fig. 3 and Fig. 5, the diffusing glass 22 may be mounted in connection with a supporting member 26 or frame which is hinged to the frame 11 for the purpose of permitting access to the lamps 23 for replacement, or for the purpose of cleaning the reflectors 24.

When the frame 26 is swung about its hinges, the members 22 at both sides of the mirror 10 are carried therewith (Fig. 5) to open the compartments 12 and to expose the lamps and reflectors. Said members 22 are held to the frame 26 by means of the bottom sheet 27 terminating in the lip 28 which provides a trough for the removable reception of the lower edge of the member 26. The sheet 27 is preferably inclined inwardly and upwardly. A similar sheet 29 is arranged at the top of the frame 26 and is preferably inclined inwardly and downwardly. The vertically aligned inner corners of the sheets 27 and 29 are joined by the channel strip 32 into which the inner edges of the members 22 are inserted, while the outer corners of said sheets are joined by the channel strips 33 receiving the outer edges of said members 22.

It will be seen that each of the members 22 may readily be dropped into the channel strips 32 and 33 to rest against the lip 28 and are thereby suitably held against rattling while being mounted for quick and easy replacement if broken.

As shown in Fig. 6, the mirror and illuminating means may form a part of the cover 14 of a "make-up" box 40 having compartments 41, 42 and 43. Said cover is suitably hinged to the remainder of the box to stand at the proper angle for use when the box rests on a table, dresser or the like. For this purpose, we may use hinges of the usual type in connection with the slotted links 34. A pin as 35 pivots one end of the link to the cover, while the pin 36 passes through the slot 37 and limits the angle assumed by the cover when open.

In Fig. 7, a mirror and illuminating means at the sides of the mirror 10 is arranged to stand on a table or other flat surface by means of the easel support 50. Or the mirror with its illuminator may be hung up on the wall in any suitable manner, as by means of the hook 51, after said hook has first been turned about its pivot to engage a wire, picture molding or the like.

In that form of our invention shown in Fig. 8, the mirror 10 and illuminating compartment 12 form part of the cover 15 for a portmanteau, luggage case or the like, being built thereinto. The flexible stamps 52 serve to limit the angle to which the cover opens, so that the container part of the case may rest on a horizontal surface of table height approximately to enable the user to see his or her illuminated face in the mirror.

In Fig. 9, the mirror and illuminating means forming part of the cover of the box 60, which may be a "make-up" box or any other kind of box, is adapted to be adjusted in various positions relatively near or far away from the observer, and to be held in the proper angular position for use.

Such adjustment may be accomplished by providing rigid rails 61 of metal or the like along each inside side of the box near the upper edges thereof, and providing in such rail 61, a series of lower notches 62 which may receive a roller 63 attached to a spring-pressed arm 64, the other end of the arm being pivoted at 65 to the cover 66 which contains the mirror 10 and illuminating means not shown. The cover may have a lug or bar 67 adapted to fit in one of a series of notches 68 in the upper edge of the rail for the purpose of holding the cover 66 in an upright angular or inclined position, as shown. Moving the cover 66 from the front toward the rear or vice versa to positions determined by the notches 62 and 68, by first pressing the rollers 63 out of the notches 62 when the cover is to be moved forwardly, permits the adjustment of the cover 66 in a position relatively near to or far away from the observer before the mirror. The arms 64 are normally pressed by their springs in the proper direction to engage the rollers 63 in their notches, said arms serving also to pivot the cover to the remainder of the box.

In Fig. 10, the mirror 10 and the side illuminating compartments 12 faced by the diffusing glass 22, are shown applied to the door of a medicine cabinet 70 set in the tiled wall 71. The necessity for using an overhead light on such door to illuminate the face of the user when shaving or making up with cosmetics is thereby eliminated.

The invention may be operated by connecting the illuminating lamps by means of the switch 31 to a suitable source of electric current. The heat generated by the lamps 23 or 30 may escape through the vents 25 and prevent temperature of the parts from exceeding a safe value. The air space 21 behind the mirror likewise provides ventilation for preventing overheating of the mirror 10. The observer when positioned in front of the mirror at the normal distance suitable to obtain the desired image in the mirror, has his face uniformly lighted, no obstructing shadows being cast by his features to darken any part of his face.

Light from the lamps 23 on each side of the mirror is concentrated by the reflector 24 and reflected or focussed in a direction toward the observer before the mirror. The diffusing glasses 22 cause uniform lighting, prevent glare and shadows, and have a plane substantially normal to the direction of the rays of light from the lamp 23. The invention thus provides not only a suitable quantity of light without glare but provides such light in a direction to uniformly illuminate all parts of the surface of the face of an observer before a mirror without shadows, and thus accomplishes the result of providing a very effective device for make-up purposes or the like.

Heretofore, the light provided for such purposes has produced a glare on certain areas and deep shadows on others or did not accomplish the purpose of illuminating the entire surface of the object such as the face, to be viewed in the mirror. Even natural light coming from windows in the side of the room frequently and usually may not illuminate the entire surface minutely of the face, and as is well known in the theatrical industry, actors are frequently required to repeat their make-up operations which resulted from want of adequate illuminating of the entire surface of the face.

It will be seen that we have provided a simple device, adapted for application to fixed or portable mirrors, by themselves or in connection with mirrored furniture, cabinets or the like, or with portable containers, and adapted for use wherever electric current is available, for illuminating the face of a user uniformly and brightly.

While we have described and shown preferred forms of our invention, it will be understood that any changes or modifications which occur to those skilled in the art are to be included within the scope of the appended claims.

We claim:

1. A mirror, a diffusing glass panel at each side of said mirror having planes oblique to the plane of said mirror, light sources behind said diffusing panel, reflecting means for directing the light from said light sources through said diffusing panels to a location in front of said mirror, and supporting means for the above-mentioned elements, said supporting means constituting the cover of a receptacle, and means for adjusting said cover angularly and also linearly with respect to said receptacle including a stop member adapted to prevent relative movement of the cover and receptacle in the adjusted positions thereof.

2. A portable container including a cover, a mirror and illuminating means secured to said cover, and means including notched rails secured to the container for adjustably mounting and positioning said cover of said container angularly and linearly with respect to the remainder of said container.

3. A portable container including a cover, a mirror and illuminating means secured to said cover, and means for adjustably mounting and positioning said cover angularly and linearly with respect to the remainder of said container including a link pivoted at one end to the cover, and means on the container for slidably engaging the other end of the link and for slidably supporting the cover.

4. A container comprising a bottom portion and a cover portion and means pivotally connecting said portions, said cover portion including a mirror and illuminating means at the side of said mirror, and means including a notched rail secured to said bottom portion and a link pivoted to said cover portion and cooperating with said notched rail for positioning said cover portion angularly and linearly with respect to said bottom portion.

5. A portable illuminating and mirror device comprising a closable container having a bottom portion adapted to hold articles and a cover portion pivotally connected to said bottom portion, a mirror secured centrally of the inside of said cover portion, light-diffusing glass plates on opposite sides of said mirror and having edges adjacent said sides of said mirror, the planes of said plates being oblique with respect to the plane of said mirror, a reflector provided with a curved reflecting surface behind and cooperating with each of said plates to enclose each of said light sources, said reflector extending along a curved surface from one edge to an opposite edge of each of said plates to form the rear and sides of a lighting compartment of which the plate forms the entire front, a switch, a partition parallel to and above the bottom of the cover portion and below the mirror, plates and reflectors forming a wiring compartment in the cover portion, electrical connections in the wiring compartment between said light sources and said switch, a junction box in the wiring compartment provided with side outlets and with a current receiving outlet, and conduits in the wiring compartment enclosing said connections and supporting said light sources, said conduits being rigidly connected to the junction box at said side outlets.

6. A portable illuminating and mirror device comprising a closable container having a bottom portion adapted to hold articles and a cover portion pivotally connected to said bottom portion, a mirror secured centrally of the inside of said cover portion and spaced from the rear of said cover portion, light-diffusing glass plates on opposite sides of said mirror and having edges adjacent said sides of said mirror, the planes of said plates being oblique with respect to the plane of said mirror, electric light sources behind said plates intermediate the edges thereof, reflecting means having a warped reflecting surface behind and cooperating with said plates to enclose each of said light sources, said reflecting means extending from one edge to an opposite edge of each of said plates, and thereby forming the rear and sides of a lighting compartment of which a plate forms the entire front, a switch, a partition in the cover portion forming a wiring compartment below the mirror, plates, reflecting means and light sources, electrical connections between said light sources and said switch, in the wiring compartment a single member carrying said diffusing plates and having a central opening therein adapted to register with the mirror, and means movably connecting said member with said cover portion for movement together independently of the mirror light sources and reflecting means.

7. A mirror, a glass panel translucent over its entire surface arranged on each side of said mirror, said surface of each panel having a plane oblique to the plane of said mirror, a light source behind each of said surfaces, a reflector provided with a curved reflecting surface extending from one edge to the other edge of each of said panel surfaces for directing substantially all of the light from said light sources toward said surfaces, the reflector forming the rear and sides of a lighting compartment in which the light source is arranged, and the panel forming the entire front thereof, and supporting means for the above-mentioned elements including a frame carrying the panels and movable relatively to the light sources, reflectors, and mirror and having a central opening adapted normally to register with the mirror.

8. A portable container comprising a container member and a cover member, a partition in the cover member providing a wiring compartment, a centrally arranged mirror above the wiring compartment, a lighting compartment on each side of the mirror, electrically energized lighting means fixed in each of the lighting compartments, a translucent panel forming the entire front of each of the lighting compartments, a curved reflector having a concave reflecting surface fixed in the lighting compartment and behind the lighting means co-extensive with said panel and forming the rear and sides of the lighting compartment and engaging the mirror, a junction box in the wiring compartment provided with side outlets and a current receiving outlet, hollow rigid means in the wiring compartment connecting the box to the lighting means and supporting said lighting means, and an electrical conductor in said hollow means connected to the current receiving outlet and entering the junction box for energizing the lighting means.

9. A portable illuminating and reflecting container including a box-like cover, a pair of side diffusing panels each extending obliquely from the front side edge of the cover toward the rear of the cover and spaced from the rear to provide a lighting compartment of which the panel forms the entire front, a mirror between the panels and spaced from the rear of the cover to provide a ventilating compartment, a curved reflector fixed in and forming the rear and sides of the lighting compartment, a partition in spaced relation to and substantially parallel to the bottom edge of the cover forming a wiring compartment below the mirror, a switch and junction box in said wiring compartment, means for electrically connecting the switch and the box to the lighting means, rigid protecting and enclosing means in said wiring compartment for connecting the box and said lighting means and for rigidly supporting the lighting means, and current receiving means in the junction box.

10. In an illuminating and reflecting device of the character described, a mirror, means for supporting the mirror, a diffusing glass panel at each side of the mirror, each of the panels being arranged in a plane oblique to the plane of the mirror, a light source behind each of said panels, reflecting means behind each of the light sources, and means for supporting said panels for removal from said device as a unit to expose the light sources simultaneously comprising a sheet metal frame having a central opening and a side opening on each side of the central opening, said panels being arranged in said side openings and said central opening being adapted to register with the mirror in the operative position of said frame, and means for movably securing the frame to the mirror supporting means.

11. In an illuminating and reflecting device, a plurality of light sources, a plurality of diffusing means for diffusing the light from said light sources, a unitary supporting frame for said plurality of diffusing means, a mirror arranged intermediate the plurality of diffusing means, means for reflecting the light from said light sources toward the diffusing means, means for supporting said mirror, light sources and reflecting means, and means for movably securing said frame to said mirror supporting means.

12. In an illuminating and reflecting device, a mirror for producing an image of an object before said mirror, a light source on opposite edges of the mirror, reflecting means for said light sources and a pair of diffusing panels for said light sources for illuminating said object, supporting means for said mirror, light sources and reflecting means, a single supporting means for said diffusing panels separate from the mirror supporting means, and means for pivotally attaching the panel supporting means to the mirror supporting means to provide access simultaneously to said light sources and reflecting means.

HENRY LEWINSOHN.
THEODORE GOLDFINGER.